United States Patent
Moyal et al.

(10) Patent No.: US 12,254,619 B2
(45) Date of Patent: Mar. 18, 2025

(54) GAN ENABLED WELDING

(71) Applicant: International Business Machines Corporation, Armonk, NY (US)

(72) Inventors: Shailendra Moyal, Pune (IN); Sarbajit K. Rakshit, Kolkata (IN); Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 17/806,356

(22) Filed: Jun. 10, 2022

(65) Prior Publication Data

US 2023/0401693 A1    Dec. 14, 2023

(51) Int. Cl.
| | | |
|---|---|---|
| G06T 7/00 | (2017.01) | |
| G06V 10/20 | (2022.01) | |
| G06V 10/44 | (2022.01) | |
| G06V 10/70 | (2022.01) | |

(52) U.S. Cl.
CPC ............ G06T 7/001 (2013.01); G06V 10/255 (2022.01); G06V 10/443 (2022.01); G06V 10/70 (2022.01); G06T 2207/30136 (2013.01); G06V 2201/07 (2022.01)

(58) Field of Classification Search
CPC .......... G06T 7/001; G06T 2207/30136; G06V 10/255; G06V 10/443; G06V 10/70; G06V 2201/07; G06V 10/82; B23K 9/0953
See application file for complete search history.

(56) References Cited

U.S. PATENT DOCUMENTS

| | | | |
|---|---|---|---|
| 2017/0200395 A1* | 7/2017 | Albrecht | G06F 3/0488 |
| 2021/0312832 A1* | 10/2021 | Salsich | G09B 19/24 |
| 2022/0035961 A1* | 2/2022 | Ziabari | G06N 3/045 |
| 2023/0056400 A1* | 2/2023 | Chakraborty | B23K 9/125 |

FOREIGN PATENT DOCUMENTS

CN          113034478 A       6/2021

OTHER PUBLICATIONS

Lei Li et al., "Quality Prediction and Control of Assembly and Welding Process for Ship Group Product Based on Digital Twin", 2020, Wiley, vol. 2020, Article ID 3758730, 13 pages (Year: 2020).*

(Continued)

*Primary Examiner* — Molly Wilburn
(74) *Attorney, Agent, or Firm* — Daniel M. Yeates

(57) ABSTRACT

A method for performing a welding procedure includes determining conditions of the welding procedure using a virtual image of a structure on which the welding procedure is to be performed. The method further includes generating specifications for performing the welding procedure based on the conditions. The method further includes generating a virtual reference shape based on the conditions and the specifications, the virtual reference shape generated by modifying the virtual image. The method further includes comparing a resulting shape of the welding procedure with the virtual reference shape. The method further includes determining a quality of the welding procedure based on the comparison. The method further includes storing data pertaining to the welding procedure.

20 Claims, 5 Drawing Sheets

(56) References Cited

OTHER PUBLICATIONS

Brownlee, J., "A Gentle Introduction to Generative Adversarial Networks (GANs)—Machine Learning Mastery," https://machinelearningmastery.com/what-are-generative-adversarial-networks-gans/, Jul. 19, 2019, 15 pgs.

Fan et al., "Real-Time High-Performance Laser Welding Defect Detection by Combining ACGAN-Based Data Enhancement and Multi-Model Fusion," https://www.hindawi.com/journals/scanning/2020/3758730/, Sensors 2021, 21, 13 pgs.

Gantala et al., "Automated Defect Recognition for Welds Using Simulation Assisted TFM Imaging with Artificial Intelligence," https://publications.iitm.ac.in/publication/automated-defect-recognition-for-welds-using-simulation-assisted, published online Feb. 25, 2021, 24 pgs.

Gao et al., "A Generative Adversarial Network-based Deep Learning Method for Low-quality Defect Image Reconstruction and Recognition," DOI 10.1109/TII.2020.3008703, IEEE Transactions on Industrial Informatics, https://www.researchgate.net/publication/342912153_A_Generative_Adversarial_Network_Based_Deep_Learning_Method_for_Low-Quality_Defect_Image_Reconstruction_and_Recognition, 10 pgs.

Huang et al., "A Laser-Based Vision System for Weld Quality Inspection," Sensors 2011, 11, 506-521; doi: 10.3390/s110100506, https://www.mdpi.com/1424-8220/11/1/506.

Li et al., "Quality Prediction and Control of Assembly and Welding Process for Ship Group Product Based on Digital Twin," https://www.hindawi.com/journals/scanning/2020/3758730/, Hindawi, Scanning, vol. 2020, Article ID 3758730, 13 pgs.

Mell et al., "The NIST Definition of Cloud Computing," Recommendations of the National Institute of Standards and Technology, U.S. Department of Commerce, Special Publication 800-145, Sep. 2011, 7 pgs.

Naddaf et al., "Next-Generation of Weld Quality Assessment Using Deep Learning and Digital Radiography," https://www.researchgate.net/publication/340234164_Next-Generation_of_Weld_Quality_Assessment_Using_Deep_Learning_and_Digital_Radiography, Mar. 2020, 5 pgs.

Zhang et al., "Defect-GAN: High-Fidelity Defect Synthesis for Automated Defect Inspection," https://openaccess.thecvf.com/content/WACV2021/papers/Zhang_Defect-GAN_High-Fidelity_Defect_Synthesis_for_Automated_Defect_Inspection_WACV_2021_paper.pdf, pp. 2524-2534, Jan. 2021.

\* cited by examiner

GAN ENABLED WELDING

BACKGROUND

The present disclosure relates generally to the field of computer-aided manufacturing, and more particularly to utilizing computer modeling to improve welding quality.

Fabrication processes, including repair processes, are performed to achieve an intended structure within a desired tolerance. Accordingly, it is appropriate to evaluate the outcomes of the performance of such processes to determine whether the intended structure within the desired tolerance has been achieved. If not, it is appropriate to modify the process for subsequent performance with the goal of achieving or making progress toward achieving the intended structure within the desired tolerance, thereby improving the quality of the process. One example of a process that is performed for both fabrication and repair is welding.

SUMMARY

Embodiments of the present disclosure include a method, system, and computer program product for performing a welding procedure. The method includes determining conditions of the welding procedure using a virtual image of a structure on which the welding procedure is to be performed. The method further includes generating specifications for performing the welding procedure based on the conditions. The method further includes generating a virtual reference shape based on the conditions and the specifications, the virtual reference shape generated by modifying the virtual image. The method further includes comparing a resulting shape of the welding procedure with the virtual reference shape. The method further includes determining a quality of the welding procedure based on the comparison. The method further includes storing data pertaining to the welding procedure.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
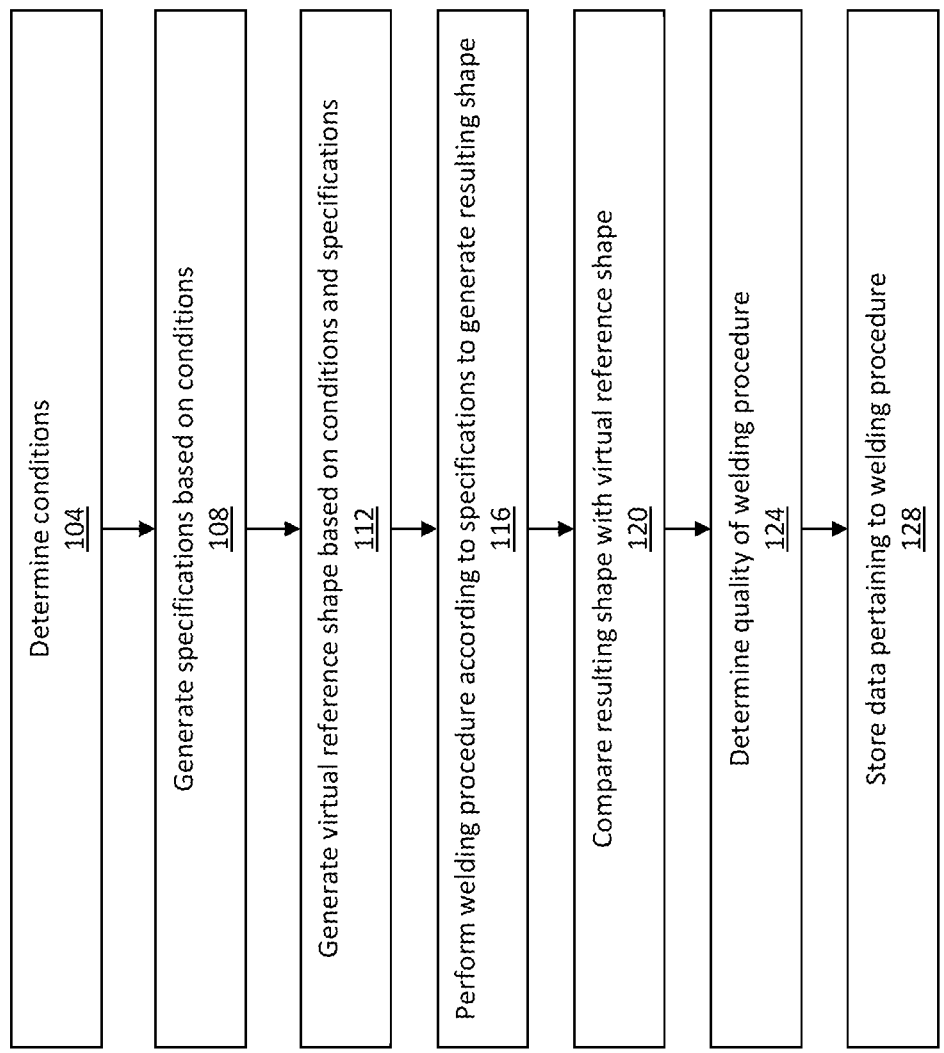
FIG. 1 illustrates a flowchart of an example method for performing a welding procedure, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computer-aided manufacturing, and in particular to utilizing computer modeling to improve welding quality. While the present disclosure is not necessarily limited to such applications, various aspects of the disclosure may be appreciated through a discussion of various examples using this context.

Fabrication processes, including repair processes, are performed to achieve an intended structure within a desired tolerance. Accordingly, it is appropriate to evaluate the outcomes of the performance of such processes to determine whether the intended structure within the desired tolerance has been achieved. If not, it is appropriate to modify the process for subsequent performance with the goal of achieving or making progress toward achieving the intended structure within the desired tolerance.

One example of a process that is performed for both fabrication and repair is welding. Generally, welding is a fabrication process that joins materials, typically metals or thermoplastics, by using high heat to melt the parts together and allowing them to cool, causing fusion. In addition to melting the base material, a filler material is typically added to the joint where the materials are being joined to form a pool of molten material. This pool, which may be referred to as a weld pool, cools to form a joint that, depending on weld configuration, can be stronger than the base material. Pressure may also be used, either with heat or instead of heat, to produce a weld.

Many different energy sources can be used for welding, including a gas flame (chemical), an electric arc (electrical), a laser, an electron beam, friction, and ultrasound. While often an industrial process, welding may be performed in many different environments, including in open air, under water, and in outer space. Welding in industrial settings is often performed by robots, which utilize computer programming to completely automate the welding process by both handling the part and performing the welding. Robot welding is commonly used for resistance spot welding and arc welding in high production applications, such as in the automotive industry.

Welding procedures can be performed with a wide variety of specifications, such as for example, the type of filler material, the amount of filler material, the type of welding technique that is used, the shape of weld and distribution of filler material, the speed at which the welding technique is performed, and the geometry of the weld joint.

As an industrial process, the cost of welding plays a crucial role in manufacturing decisions. Many variables affect the total cost, including equipment cost, labor cost, material cost, and energy cost. Depending on the particular welding process being performed, equipment costs can vary, from inexpensive for methods like shielded metal arc welding and oxyfuel welding, to extremely expensive for methods like laser beam welding and electron beam welding. Similarly, the inclusion of automation and robots can be considered to be further equipment costs. Labor costs depend, in part, on the deposition rate and the total operation time, including time spent fitting, welding, and handling the part. The cost of materials can include the cost of the base and filler material, the cost of shielding gases, and energy costs, depending on arc time and welding power demand. Accordingly, the ability to determine which materials, methods, equipment, and labor are best for a particular welding procedure, depending on the particular circumstances of the weld, is a challenge.

Additionally, following the performance of a repair, maintenance, or fabrication process, such as welding, comparison of the resulting object with respect to a reference object enables evaluation of the quality of the process. However, in various scenarios, the reference object may not be available for comparison with the resulting object, limiting evaluation of the quality of the process. Moreover, different circumstances of the welding procedure may require different reference objects. For example, the load that is expected to be applied on a welded object will impact the specifications of the weld required to support such a load. Accordingly, a particular reference object may not provide a suitable comparison for every resulting object, depending on the specific circumstances of the performance of a given welding procedure.

Embodiments of the present disclosure may overcome these and other challenges by utilizing computer modeling to facilitate analysis of a resulting object that is specific to the particular circumstances of the welding procedure. More specifically, embodiments of the present disclosure may use machine learning, such as for example, including a generative adversarial network (GAN) enabled system to generate a virtual reference shape based on conditions and specifications for use in a comparison with a resulting object. Moreover, embodiments of the present disclosure may further enable providing feedback to the GAN enabled system to facilitate the generation of increasingly accurate virtual reference shapes, thereby improving the quality of subsequent welding procedures. Additionally, embodiments of the present disclosure may utilize computer modeling to facilitate optimization of the specifications of a welding procedure. The durability and life of dynamically welded structures is often determined, in part, by the welds. Accordingly, improving the quality of welding procedures can have long-reaching impacts on the welded structures.

FIG. 1 depicts a flowchart illustrating an example method 100 for performing a welding procedure in accordance with embodiments of the present disclosure. In accordance with at least one embodiment of the present disclosure, the method 100 begins with the performance of operation 104, wherein conditions for the welding procedure are determined. In accordance with at least one embodiment of the present disclosure, the performance of operation 104 can include the performance of one or more sub-operations.

Conditions for the welding procedure can include, for example, the environment in which the welding procedure will be performed. If the welding procedure is an initial fabrication procedure, it may be more likely to be performed in a manufacturing facility. In contrast, if the welding procedure is a repair procedure, it may be more likely to be performed outdoors. If the welding procedure is to be performed in a manufacturing facility, the environmental conditions, such as temperature, humidity, and airflow will be relatively predictable and stable. In contrast, if the welding procedure is to be performed outdoors, the temperature, humidity, airflow, and possible precipitation may vary substantially. Accordingly, environmental conditions for the performance of the welding procedure, which can impact the specifications of the welding procedure, are determined prior to the performance of the welding procedure.

Conditions for the welding procedure may also include, for example, the environment in which the resulting object will be used. As an illustrative example, a resulting object that is expected to bear compressive loads may have different specifications for the welding procedure than a resulting object that is expected to bear shear loads.

As an illustrative example, a welding procedure may be to repair a damaged existing welding joint on a steel bridge that supports a particular amount and density of automobile traffic. Conditions for such a welding procedure may include an outdoor environment in a hot and humid climate for a compressive load that will experience a high amount of physical stress. Conditions may also include the particular base and filler materials present at the existing welding joint, the geometry of the existing welding joint, and the degree of damage on the existing welding joint.

Following the determination of the conditions of the existing welding joint, the method 100 proceeds to operation 108, wherein specifications for the welding procedure are generated based on the determined conditions. In accordance with at least one embodiment of the present disclosure, the performance of operation 108 can include the performance of one or more sub-operations.

Specifications for the welding procedure may include, for example, the type of welding method to be performed, the filler material to be used, the amount of filler material to be used, the speed at which the filler material is to be applied, and the shape of the application of the filler material.

In accordance with at least one embodiment of the present disclosure, the specifications of the welding procedure may be generated, at least in part, based on historical data, which may include information regarding which specifications are best suited to various combinations of conditions. In such embodiments, the specifications of the welding procedure may be generated automatically by an artificial intelligence (AI) module configured to analyze historical data.

Following the generation of specifications for the welding procedure, the method 100 proceeds to operation 112, wherein a virtual reference shape for the welding procedure is generated based on the determined conditions and generated specifications. In accordance with at least one embodiment of the present disclosure, the performance of operation 112 can include the performance of one or more sub-operations.

The virtual reference shape provides a reference object for the welding procedure that is yet to be performed. The generation of the virtual reference shape obviates the need for an actual reference object. This may be particularly useful where, as in the example provided above, the reference object is an existing welding joint of a steel bridge. In such examples, a tangible reference object may not exist or be practical to generate. Accordingly, the generation of a virtual reference shape for the welding procedure enables the provision of a reference shape for instances in which a tangible reference shape is not available. In this way, the method 100 can improve the quality and efficiency of welding procedures.

Following the generation of a virtual reference shape, the method 100 proceeds to operation 116, wherein a welding procedure is performed according to the generated specifications. In accordance with at least one embodiment of the present disclosure, the performance of operation 116 can include the performance of one or more sub-operations.

In accordance with some embodiments of the present disclosure, the welding procedure may be performed by a human. In accordance with other embodiments of the present disclosure, the welding procedure may be performed by a computer system, which may include a robot. Which entity performs the welding procedure can be one of the generated specifications. Regardless of which entity performs the welding procedure, the performance of the welding procedure generates a resulting shape. In other words, the resulting shape is the outcome of the performed welding procedure.

Following the performance of the welding procedure and the generation of the resulting shape, the method 100 proceeds to operation 120, wherein the resulting shape is compared with the virtual reference shape. In accordance with at least one embodiment of the present disclosure, the performance of operation 120 can include the performance of one or more sub-operations.

The resulting shape was generated by the performance of the welding procedure according to the generated specifications in the actual conditions of the welding procedure. The virtual reference shape was generated based on the generated specifications and the determined conditions of the welding procedure. Accordingly, the comparison of the resulting shape with the virtual reference shape should, ideally, result in a close match. In other words, the resulting shape should be substantially similar to the virtual reference shape, within a tolerance. The comparison of the resulting shape with the virtual reference shape can be quantified by an amount of difference between the resulting shape and the virtual reference shape.

In accordance with at least one embodiment of the present disclosure, the comparison of the resulting shape and the virtual reference shape can include utilizing augmented reality. For example, the resulting shape can be viewed using an augmented reality device that includes the virtual reference shape to enable a virtual comparison. The use of augmented reality can be performed either by a human operator or by a computer, including a sensor which can take in visual information from the resulting shape and automatically compare the resulting shape with the virtual reference shape. In alternative embodiments, other non-destructive evaluative techniques can be used to take in information from the resulting shape. For example, ultrasonic or x-ray waves can be used to take in visual information from the resulting shape to be automatically compared with the virtual reference shape.

Following the comparison of the resulting shape with the virtual reference shape, the method 100 proceeds to operation 124, wherein the quality of the welding procedure is determined. In accordance with at least one embodiment of the present disclosure, the performance of operation 124 can include the performance of one or more sub-operations.

The quality of the welding procedure can be determined using the comparison of the resulting shape with the virtual reference shape. For example, if the resulting shape is substantially different (perhaps outside a predetermined threshold) from the virtual reference shape, it may be determined that the quality of the welding procedure is not high. Conversely, if the resulting shape is substantially similar (perhaps within a predetermined threshold) to the virtual reference shape, it may be determined that the quality of the welding procedure is high. The quality of the welding procedure may be qualitative (high, not high), or quantitative (70%, 98%). Additionally, the standards for determining the qualitative or quantitative quality of the welding procedure may be predetermined.

Following the determination of the quality of the welding procedure, the method 100 proceeds to operation 128, wherein data pertaining to the performed welding procedure is stored. In accordance with at least one embodiment of the present disclosure, the performance of operation 128 can include the performance of one or more sub-operations.

Data pertaining to the performed welding procedure may include the conditions, the virtual reference shape, the specifications, and the quality of the welding procedure. Such data may then be utilized during subsequent performance of the method 100. For example, if the welding procedure is determined to be of poor quality, such data may be used to generate different specifications and/or virtual reference shapes for subsequent performances of the method 100 for similar conditions. Conversely, if the welding procedure is determined to be of good quality, such data may be used to confirm or strengthen the recommended specifications and/or virtual reference shapes for subsequent performance of the method 100 for similar conditions. Accordingly, the performance of the method 100 enables improvement of welding procedures by integrating feedback from the performance of real-life welding procedures.

In accordance with at least one embodiment of the present disclosure, if the welding procedure is determined to be of poor quality (below a predetermined quality threshold and/or in a predetermined quality range), the method 100 may further include rejecting the welded piece and/or modifying the specifications and performing a modified welding procedure on the same piece to fix the piece, improving the quality thereof. For example, the method 100 may include determining that the weld does not meet a minimum quality threshold and further determining that the minimum quality threshold is not met because the weld is too thin. In this example, the method may further include rejecting the welded piece, modifying the specifications of the welding procedure to increase the flux or change the type of weld, and performing a modified welding procedure on the rejected piece to improve the quality thereof. In such embodiments, the method can be considered to return to operation 104, wherein the rejected piece is used in the determination of the conditions for the modified welding procedure.

In accordance with at least one embodiment of the present disclosure, if the welding procedure is determined to meet a minimum quality threshold but still be of suboptimal quality (falling in a predetermined quality range), the method 100 may further include modifying the specifications for subsequent welding procedures, thereby improving the quality thereof.

Figure 2:
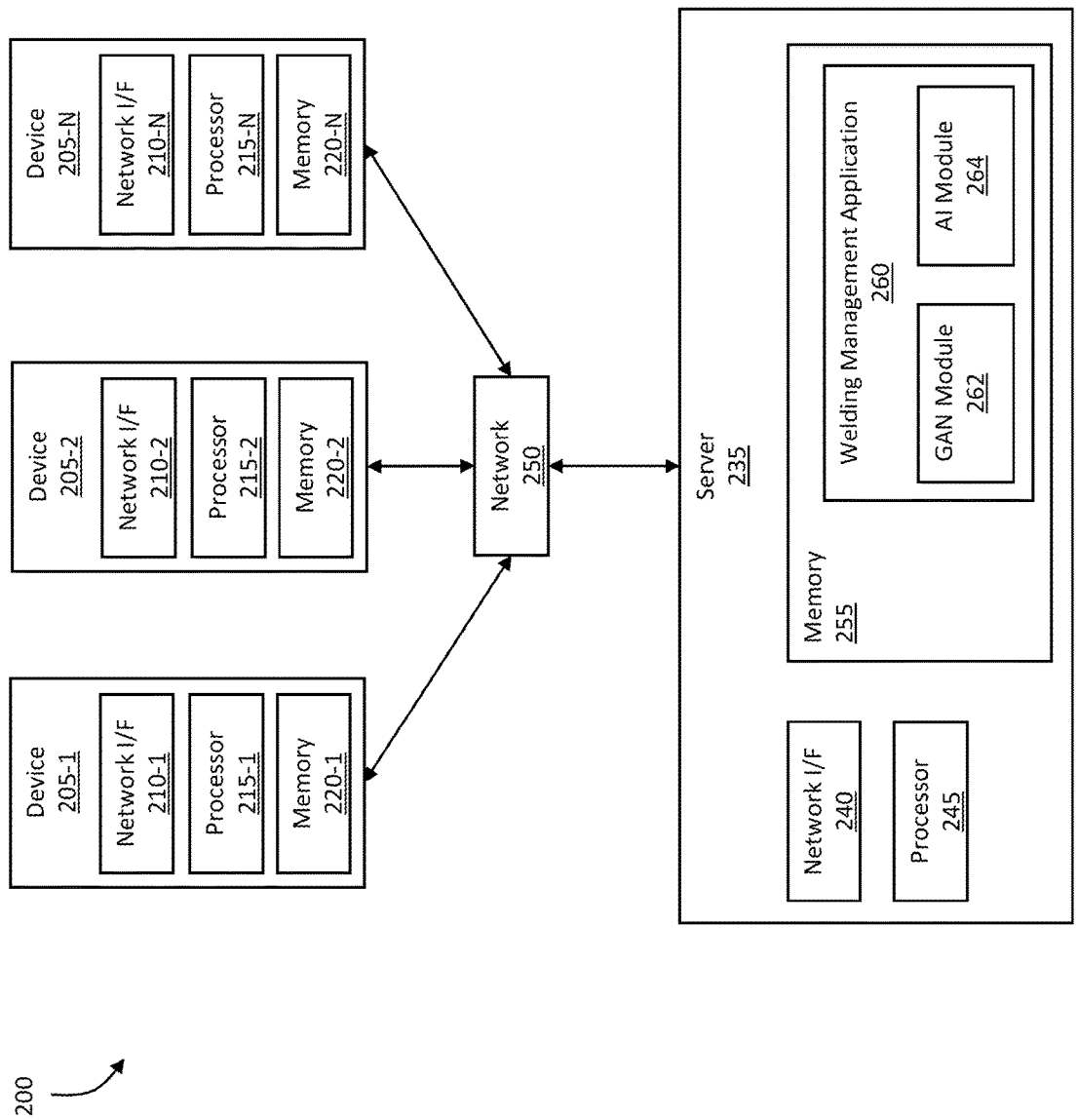
FIG. 2 depicts a block diagram illustrating an example computing environment in which illustrative embodiments of the present disclosure can be implemented, in accordance with embodiments of the present disclosure.

FIG. 2 depicts a block diagram illustrating an example computing environment 200 in which illustrative embodiments of the present disclosure can be implemented. For example, in accordance with embodiments of the present disclosure, the example computing environment 200 is configured to perform the method 100 (shown in FIG. 1). The computing environment 200 includes a plurality of devices 205-1, 205-2 . . . 205-N (collectively devices 205), at least one server 235, and a network 250.

Each of the devices 205 includes one or more processors 215-1, 215-2 . . . 215-N (collectively processors 215) and one or more memories 220-1, 220-2 . . . 220-N (collectively memories 220). Similarly, the server 235 includes at least one processor 245 and at least one memory 255. The devices 205 and the server 235 can be configured to communicate with each other through internal or external network interfaces 210-1, 210-2 . . . 210-N (collectively network interfaces 210) and 240, respectively. The network interfaces 210 and 240 are, in some embodiments, modems or network interface cards. The devices 205 and/or the server 235 can be equipped with a display or monitor. Additionally, the devices 205 and/or the server 235 can include optional input devices (for example, a keyboard, mouse, sensor, camera), optional output devices (for example, a display, welding tool) and/or any commercially available or custom software (e.g., browser software, communications software, server software, natural language processing software, search engine and/or web crawling software, image processing software, extended reality (XR) software, etc.). The devices 205 and/or the server 235 can be servers, desktops, laptops, financial transaction terminals, or hand-held devices.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In some embodiments, the network 250 may be substantially similar to, or the same as, cloud computing environment 50 described in FIG. 4.

The server 235 includes a welding management application 260. The welding management application 260 can be configured to present and/or transmit conditions under which a welding procedure is to be performed, specifications generated by the welding management application 260, a resulting shape following the performance of a welding procedure, a virtual reference shape for the welding procedure in response to and based on conditions pertaining to the welding procedure, a comparison of the resulting shape and the virtual reference shape, and/or a determined quality of the welding procedure.

More specifically, the welding management application 260 can be configured to receive information regarding conditions pertaining to a welding procedure that is to be performed. In accordance with at least some embodiments of the present disclosure, such information may be input into at least one of the devices 205 by a human user. Additionally, or alternatively, such information may be input into the device(s) 205 by sensors and/or cameras arranged at the location where the welding procedure is to be performed.

As noted above, the conditions can include, for example, the type of procedure (repair or fabrication) to be performed, details regarding existing materials and geometries where the procedure is to be performed, the environment in which the resulting object will be used, and the environment in which the procedure will be performed. Accordingly, any suitable type of user command can be used to input information regarding the conditions of the welding procedure to be performed. For example, a user can input such information via a touch screen (e.g., via menu selection commands received on a touch screen), a mouse, a keyboard, a voice command, or any other suitable input mechanism. Similarly, any suitable type of sensor can be used to collect and transmit information regarding the conditions of the welding procedure to be performed. For example, a thermometer can be used to collect and transmit ambient temperature information, a hygrometer can be used to collect and transmit humidity information, an anemometer can be used to collect and transmit wind speed information, a virtual eye can be used to collect and transmit visually detectable information, and other sensors can be used to collect and transmit other pertinent information.

In accordance with at least one embodiment of the present disclosure, the information regarding the conditions can include one or more photos of the structure or pieces to be welded during the welding procedure. Accordingly, in such embodiments, the welding management application is configured to receive at least one photo, which may also be referred to as a virtual image of the structure or pieces on which the welding procedure is to be performed.

The welding management application 260 can be further configured to analyze the received information to determine the conditions of the welding procedure. An example embodiment of such a determination has been described above regarding operation 104 of the method 100. Determining the conditions can include, for example, determining environmental factors, determining physical boundaries for the performance of the welding procedure, and determining necessary load bearing capacities for the welded structure, and determining other useful information about the performance of the welding procedure.

In accordance with at least one embodiment of the present disclosure, the virtual image of the structure or pieces on which the welding procedure is to be performed are used to determine the conditions of the welding procedure. In such embodiments, the welding management application 260 is configured to determine the conditions of the welding procedure using the virtual image.

The welding management application 260 can be further configured to generate specifications for the welding procedure based on the determined conditions. An example embodiment of such a generation has been described above regarding operation 108 of the method 100. Generating the specifications can include utilizing the AI module 264 of the welding management application 260 to analyze the conditions for the welding procedure and use the results of such analysis to generate specifications for the welding procedure.

More specifically, in accordance with some embodiments of the present disclosure, the AI module 264 may be configured to search through stored records of previous conditions and specifications for various previously executed welding procedures. Such stored records may have been entered into the memory 255 by a user prior to the generation of the specifications by the AI module 264. Alternatively, or additionally, stored records may have been automatically entered into the memory 255 by the welding management application 260 during the course of a prior performance of the method 100.

As noted above, generated specifications for the welding procedure may include, for example, the type of welding method to be performed, the filler material to be used, the amount of filler material to be used, the speed at which the filler material is to be applied, and the shape of the application of the filler material.

The welding management application 260 can be further configured to generate a virtual reference shape based on the determined conditions and generated specifications. An example embodiment of such a generation has been described above regarding operation 112 of the method 100. Generating the virtual reference shape can include utilizing the GAN module 262 of the welding management application 260 to utilize the determined conditions and generated specifications for the welding procedure to generate a virtual reference shape for the welding procedure. As an illustrative example, in accordance with some embodiments of the present disclosure, the GAN module 262 can be configured to generate the virtual reference shape by modifying a virtual image of the pieces or structure to be welded, such virtual image being part of the input information regarding the conditions of the welding procedure to be performed and/or a determined condition of the welding procedure.

A GAN is a type of machine learning framework where a discriminator model (for example, a first neural network) and a generator model (for example, a second neural network) can be cooperatively coupled to learn in an unsupervised manner. The discriminator can be configured to determine whether an input (for example, an image generated by the generator) is real or fabricated, and a generator can be configured to attempt to "fool" the discriminator by generating input data (for example, fabricated images) for the discriminator.

In the context of the present disclosure, the generator component of the GAN can be configured to generate the virtual reference shape by modifying the virtual image using the generated specifications, and the discriminator component of the GAN can be configured to determine whether the generated virtual reference shape is sufficiently realistic (for example, whether the generated virtual reference shape meets data criteria defining that the virtual reference shape is sufficiently realistic). However, any other suitable type of machine learning model can be implemented to generate the virtual reference shape.

Notably, in accordance with embodiments of the present disclosure, machine learning algorithms can be used to determine conditions and/or to generate specifications based on the conditions in addition to generating the virtual reference shape based on the determined conditions and generated specifications. Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In accordance with at least one embodiment of the present disclosure, software may be used to convert the virtual reference shape into a computer model on which modeling of forces and loads can be carried out to evaluate the suitability of the virtual reference shape for the application. If the computer modeling indicates that the virtual reference shape will not be suitable to sustain the planned forces and loads for a sufficient amount of time, a modified virtual reference shape may be generated.

In accordance with embodiments of the present disclosure, at least one of the devices 205 of the example computing environment 200 can be configured to perform or be used to perform a welding procedure according to the generated specifications to generate a resulting shape. An example embodiment of such a performance has been described above regarding operation 116 of the method 100. In accordance with at least one embodiment of the present disclosure, the welding management application 260 can be further configured to transmit, via the network 250, the generated specifications and generated virtual reference shape to the device 205 for the performance of the welding procedure. The device 205 can then perform the welding procedure in accordance with such information received from the welding management application 260.

In some embodiments, the device 205 may be a welding tool used by a human. In some such embodiments, the device 205 may display the generated specifications and/or generated virtual reference shape to the user. Alternatively, in some embodiments, the device 205 may be a welding robot, configured to automatically perform the welding procedure according to the generated specifications and virtual reference shape received from the welding management application 260.

In accordance with embodiments of the present disclosure, the example computing environment 200 is further configured to compare the resulting shape with the virtual reference shape. An example embodiment of such a comparison has been described above regarding operation 120 of the method 100. For example, in accordance with at least one embodiment of the present disclosure, the welding management application 260 can be configured to receive, via the network 250, a virtual image of the resulting shape formed by the performance of the welding procedure from one of the devices 205. The welding management application 260 can then use the GAN module 262 and/or the AI module 264 to perform the comparison of the resulting shape with the virtual reference shape. For example, the welding management application 260 could generate a score representing the similarity of the resulting shape with the virtual reference shape.

In some embodiments of the present disclosure, the welding management application 260 can be utilized to compare the resulting shape with the virtual reference shape as the welding procedure is being performed. Accordingly, in some embodiments of the present disclosure, real-time monitoring of the pieces and/or structure as it is being fabricated and/or repaired can include utilizing an AI scan-based method. In some embodiments of the present disclosure, real-time monitoring of the pieces and/or structure as it is being fabricated and/or repaired can include utilizing a virtual environment using augmented reality glasses for improved interaction between a welding tool and an operator of the welding tool and/or the example computing environment.

In accordance with embodiments of the present disclosure, the example computing environment 200 is further configured to determine the quality of the welding procedure. An example embodiment of such a comparison has been described above regarding operation 124 of the method 100. For example, in accordance with at least one embodiment of the present disclosure, the welding management application 260 can be configured to utilize the generated score to determine the quality of the welding procedure. In some such embodiments, the score can be compared to a predetermined threshold score or range, or set of predetermined threshold scores or ranges, the predetermined threshold score(s) or range(s) being set to correlate to a quality of the welding procedure. In some embodiments, the predetermined threshold score(s) or range(s) may be set by a user or automatically determined by the welding management application.

In accordance with at least one embodiment, the quality of the welding procedure can be determined at multiple points throughout the fabrication and/or repair. In such embodiments, real-time monitoring of the pieces and/or structure enables real-time modification of the specifications for instances in which the quality is below a predetermined threshold at any of the points of assessment. In other words, the quality of the weld at an intermediate time point, prior to completion of the weld, can be monitored to enable modification of the specifications of the weld in response to a determination that the weld is not of sufficient quality at that intermediate time point. Accordingly, in some such embodiments, the virtual reference shape may include at least one intermediate virtual reference shape to be compared with the resulting shape at a predetermined intermediate time prior to the completion of the weld. In such embodiments, the quality of the weld at that intermediate time can be determined. In such embodiments, a determination that the quality of the weld at that intermediate time is below a predetermined threshold can result in automatic modification of the specifications of the weld to be implemented for the remainder of the welding procedure.

In accordance with embodiments of the present disclosure, the example computing environment 200 is further configured to store data pertaining to the welding procedure in the memory 255. An example embodiment of such storage has been described above regarding operation 128 of the method 100. Such data can then be utilized by the welding management application 260, and specifically the AI module 264, to improve the outcome of subsequent welding procedures.

More specifically, the data pertaining to the welding procedure can include, for example, the determined conditions, the generated specifications, the generated virtual reference shape, the resulting shape, and the determined quality of the welding procedure. Accordingly, the data for the performed welding procedure is automatically integrated into the stored records of previous conditions and specifications for various previously executed welding procedures to be utilized by the AI module 264 in the generation of specifications for subsequent welding procedures.

The functionalities performed by the welding management application 260 and example computing environment 200 enable improvement of welding procedures by integrating feedback from the performance of real-life welding procedures into the stored records of previous conditions and specifications for various previously executed welding procedures to be utilized by the AI module 264 in the generation of specifications for subsequent welding procedures. This integration facilitates improved efficiency of welding by improving the efficiency of determining the specifications and reference shape of the pieces or structure to be welded. Moreover, embodiments of the present disclosure can provide a human with a corpus of information that may otherwise take a lifetime to accumulate through direct experience and observation and trial and error.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 3:
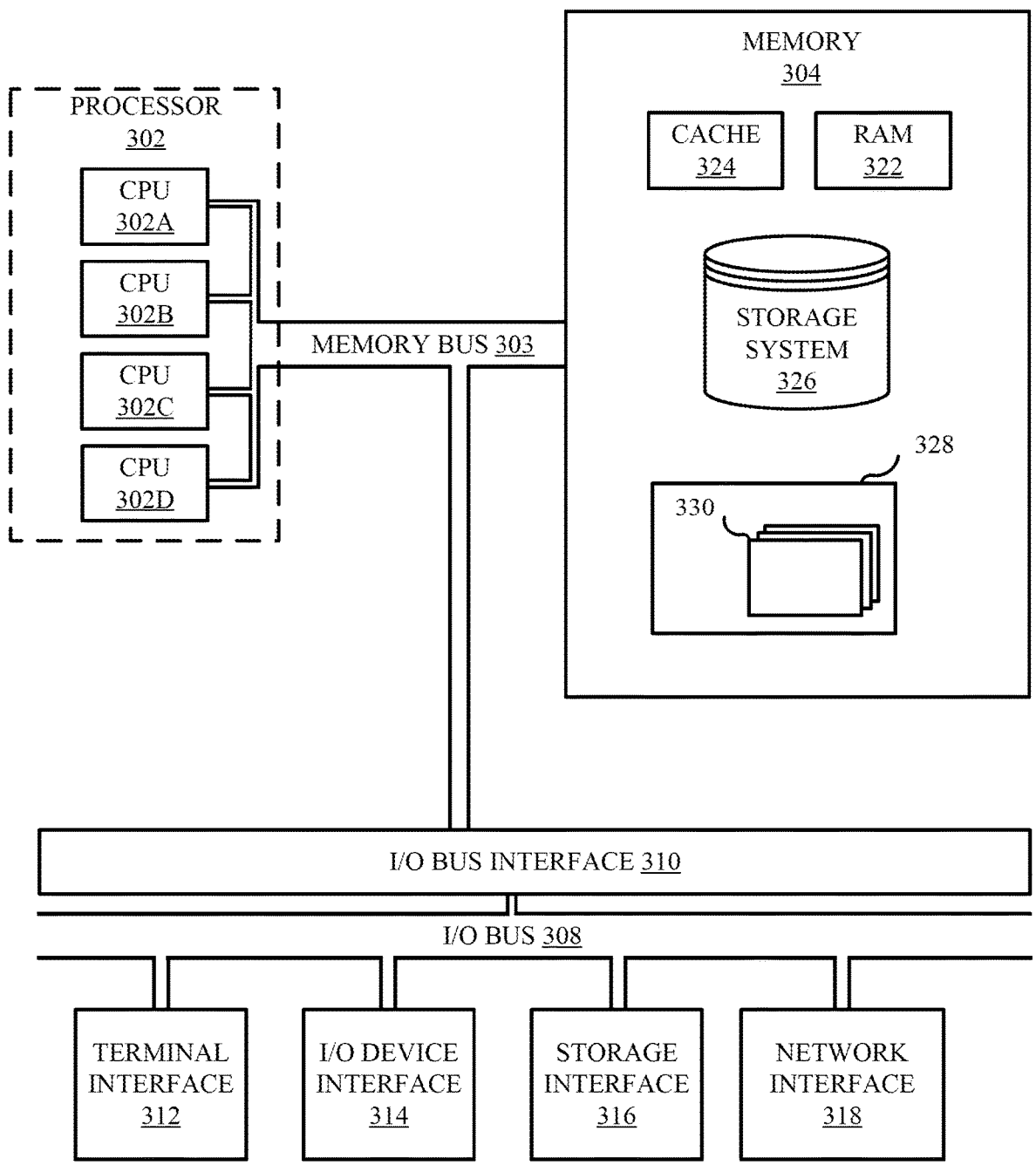
FIG. 3 depicts a high-level block diagram illustrating an example computer system that can be used in implementing one or more of the methods, tools, modules, and any related functions described herein, in accordance with embodiments of the present disclosure.

Referring now to FIG. 3, shown is a high-level block diagram of an example computer system 301 that may be utilized in various devices discussed herein (e.g., devices 205, server 235, and welding management system 260) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302 (also referred to as processors herein), a memory 304, a terminal interface 312, an I/O (Input/Output) device interface 314, a storage interface 316, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

Memory 304 may include computer system readable media in the form of volatile memory, such as random-access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

Although the memory bus 303 is shown in FIG. 3 as a single bus structure providing a direct communication path among the CPUs 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
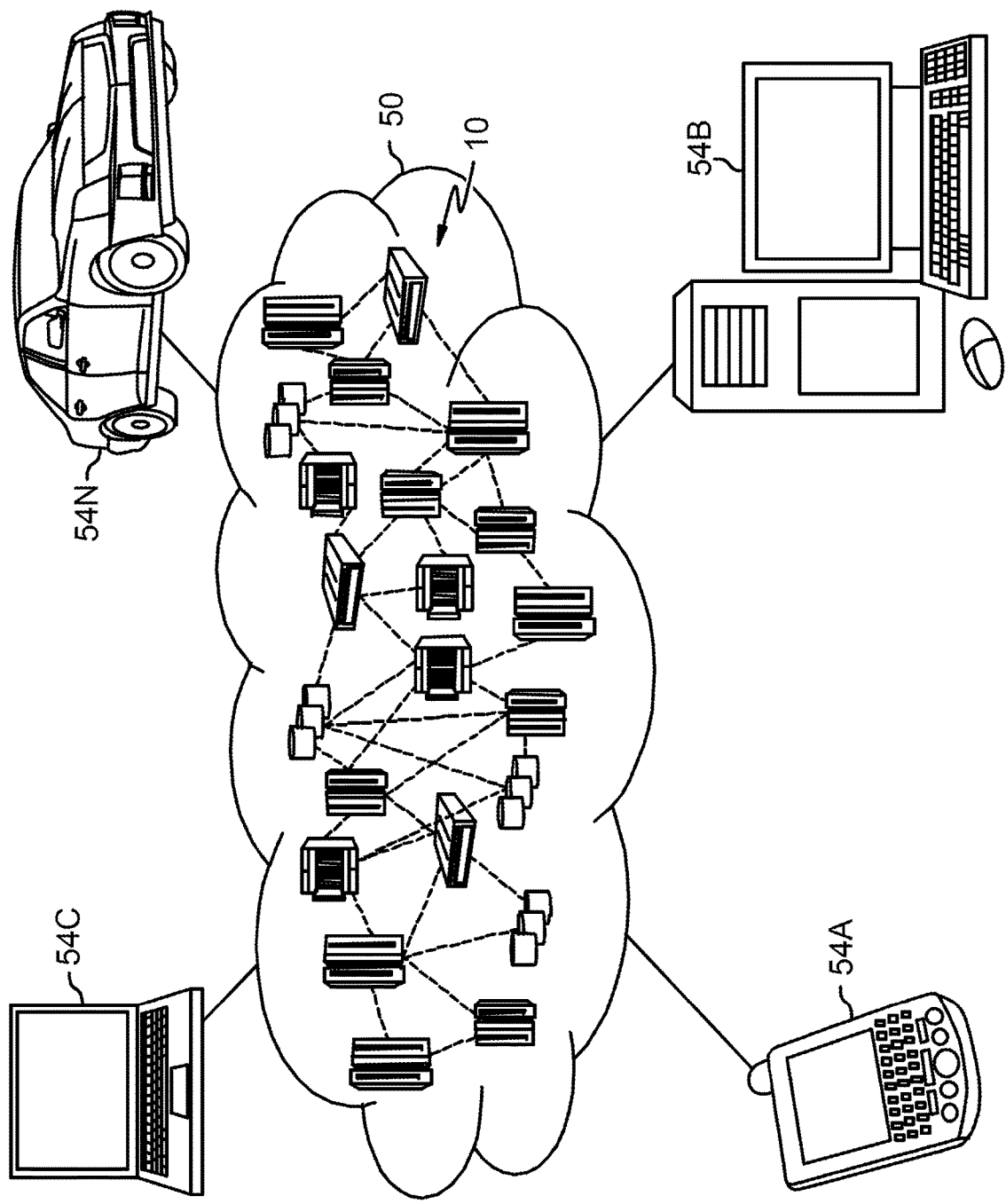
FIG. 4 depicts a cloud computing environment, in accordance with embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
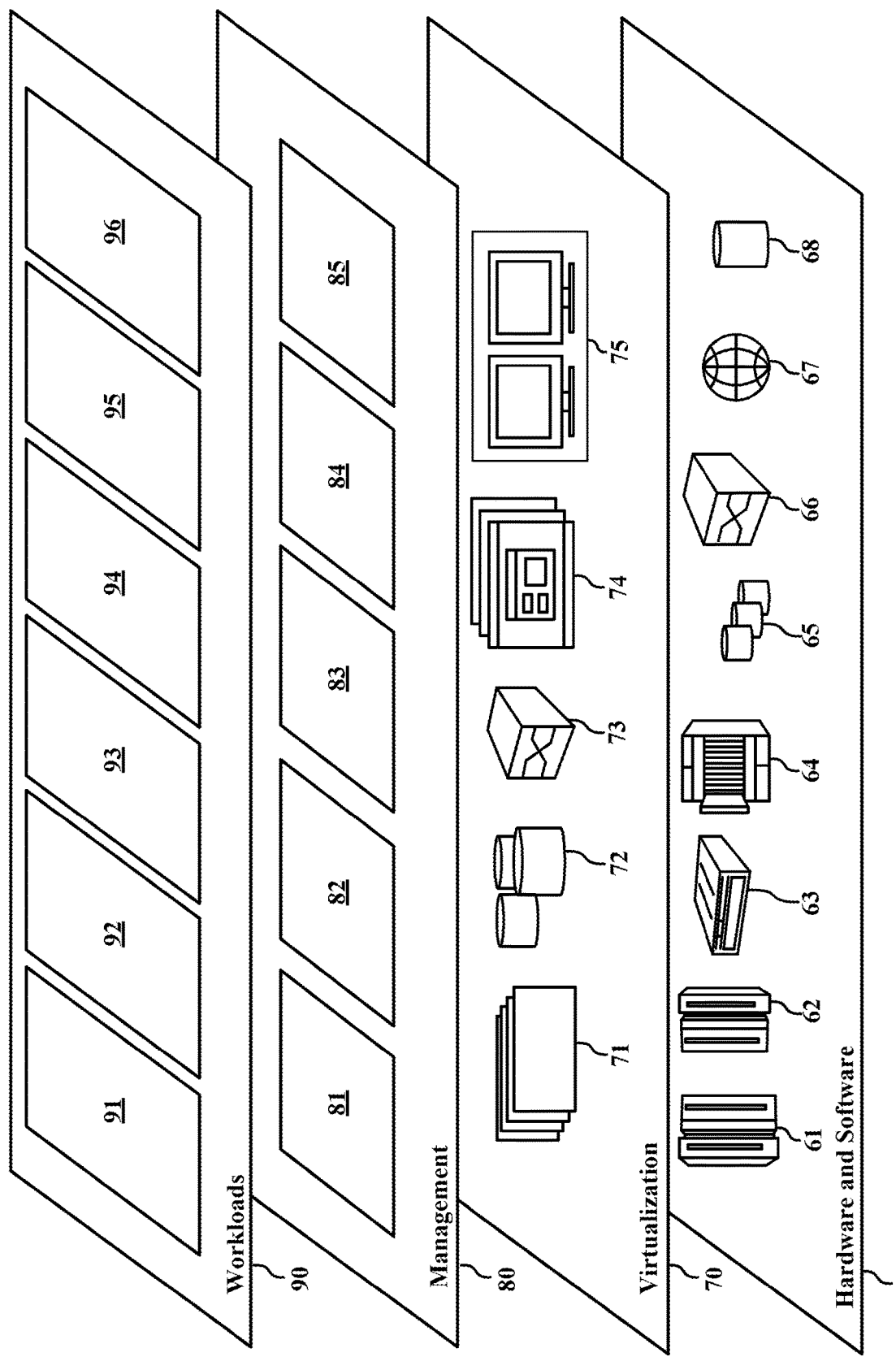
FIG. 5 depicts abstraction model layers, in accordance with embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and welding management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method, comprising:
determining conditions of a welding procedure using a virtual image of a structure on which the welding procedure is to be performed, wherein the virtual image is a photograph of the structure;
generating specifications for performing the welding procedure based on the conditions;
generating a virtual reference shape based on the conditions and the specifications, the virtual reference shape generated by modifying the virtual image and the virtual reference shape is a desired resulting shape;
comparing a resulting shape of the welding procedure with the virtual reference shape;
determining a quality of the welding procedure based on the comparison; and
storing data pertaining to the welding procedure.

2. The method of claim 1, wherein:
generating the virtual reference shape includes utilizing a generative adversarial network.

3. The method of claim 1, further comprising:
performing the welding procedure based on the specifications and the virtual reference shape.

4. The method of claim 1, further comprising:
determining further conditions of a further welding procedure; and
generating further specifications for performing the further welding procedure based on the further conditions, wherein generating the further specifications includes utilizing the stored data pertaining to the quality of the welding procedure.

5. The method of claim 4, further comprising:
generating a further virtual reference shape based on the further conditions and the further specifications.

6. The method of claim 4, wherein:
generating the further specifications includes modifying the specifications when the determined quality of the welding procedure is below a predetermined threshold.

7. The method of claim 1, wherein:
determining the quality of the welding procedure includes generating a score representing the quality of the welding procedure; and
storing the data includes storing the score.

8. A system comprising:
one or more processors; and
one or more computer-readable storage media collectively storing program instructions which, when executed by the one or more processors, are configured to cause the one or more processors to perform a method comprising:
determining conditions of a welding procedure using a virtual image of a structure on which the welding procedure is to be performed, wherein the virtual image is a photograph of the structure;
generating specifications for performing the welding procedure based on the conditions;
generating a virtual reference shape based on the conditions and the specifications, the virtual reference shape generated by modifying the virtual image and the virtual reference shape is a desired resulting shape;
comparing a resulting shape of the welding procedure with the virtual reference shape;
determining a quality of the welding procedure based on the comparison; and
storing data pertaining to the welding procedure.

9. The system of claim 8, wherein:
generating the virtual reference shape includes utilizing a generative adversarial network.

10. The system of claim 8, wherein the method further comprises:
performing the welding procedure based on the specifications and the virtual reference shape.

11. The system of claim 8, wherein the method further comprises:
determining further conditions of a further welding procedure; and
generating further specifications for performing the further welding procedure based on the further conditions, wherein generating the further specifications includes utilizing the stored data pertaining to the quality of the welding procedure.

12. The system of claim 11, wherein the method further comprises:
generating a further virtual reference shape based on the further conditions and the further specifications.

13. The system of claim 11, wherein:
generating the further specifications includes modifying the specifications when the determined quality of the welding procedure is below a predetermined threshold.

14. The system of claim 8, wherein:
determining the quality of the welding procedure includes generating a score representing the quality of the welding procedure; and
storing the data includes storing the score.

15. A computer program product comprising one or more computer readable storage media, and program instructions collectively stored on the one or more computer readable storage media, the program instructions comprising instructions configured to cause one or more processors to perform a method comprising:
determining conditions of a welding procedure using a virtual image of a structure on which the welding procedure is to be performed, wherein the virtual image is a photograph of the structure;

generating specifications for performing the welding procedure based on the conditions;

generating a virtual reference shape based on the conditions and the specifications, the virtual reference shape generated by modifying the virtual image and the virtual reference shape is a desired resulting shape;

comparing a resulting shape of the welding procedure with the virtual reference shape;

determining a quality of the welding procedure based on the comparison; and storing data pertaining to the welding procedure.

16. The computer program product of claim 15, wherein: generating the virtual reference shape includes utilizing a generative adversarial network.

17. The computer program product of claim 15, wherein the method further comprises:

performing the welding procedure based on the specifications and the virtual reference shape.

18. The computer program product of claim 15, wherein the method further comprises:

determining further conditions of a further welding procedure; and generating further specifications for performing the further welding procedure based on the further conditions, wherein generating the further specifications includes utilizing the stored data pertaining to the quality of the welding procedure.

19. The computer program product of claim 18, wherein the method further comprises:

generating a further virtual reference shape based on the further conditions and the further specifications.

20. The computer program product of claim 15, wherein:

the method further comprises determining the quality of the welding procedure includes generating a score representing the quality of the welding procedure; and storing the data includes storing the score.

* * * * *